No. 851,901. PATENTED APR. 30, 1907.
J. H. SHERRARD.
MOWER.
APPLICATION FILED FEB. 5, 1907.
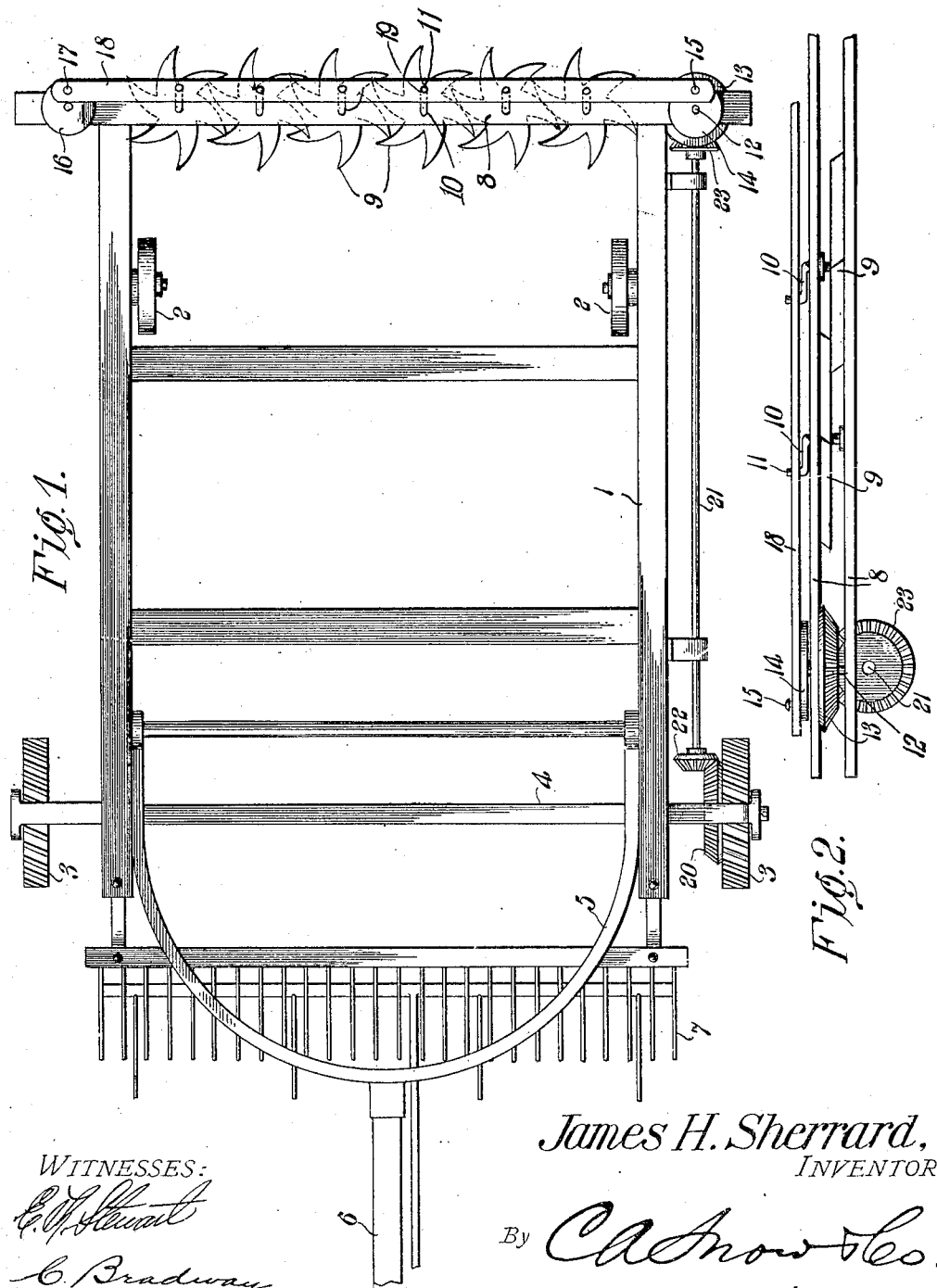
WITNESSES:
C. W. Stewart
C. Bradway.
James H. Sherrard,
INVENTOR
By C. A. Snow & Co.
ATTORNEYS

UNITED STATES PATENT OFFICE.

JAMES HALL SHERRARD, OF SPARTA, ILLINOIS.

MOWER.

No. 851,901.      Specification of Letters Patent.      Patented April 30, 1907.

Application filed February 5, 1907. Serial No. 355,908.

*To all whom it may concern:*

Be it known that I, JAMES HALL SHERRARD, a citizen of the United States, residing at Sparta, in the county of Randolph and State of Illinois, have invented a new and useful Mower, of which the following is a specification.

This invention has relation to mowers and it consists in the novel construction and arrangement of its parts as hereinafter shown and described.

The object of the invention is to provide a mower having a series of rotary sickles which coöperate with each other in cutting the vegetation. The said sickles are mounted between parallel bars which perform no function in the cutting operation as such operation is accomplished entirely by the cutting edges of the adjacent sickles. Means is provided for rotating the sickles simultaneously and said means in turn is operated by traction wheels which have contact with the ground as the implement is moved over the same.

The mower also embraces novel features of construction which will be hereinafter more fully pointed out.

In the accompanying drawing:—Figure 1 is a top plan view of the mower, and Fig. 2 is a front elevation of a portion of the forward end of the same.

The mower comprises the frame 1 which is mounted at its forward portion upon the ground wheels 2 and at its rear portion upon the traction wheels 3. The axle 4 connects the traction wheels 3 together. The bail 5 is pivotally attached to the frame 1 in the usual manner and is provided with a propelling staff 6. The rear end of the frame 1 may be provided with a grass catcher or rake 7. The horizontal parallel bars 8 are spaced apart and are located at the forward end of the frame 1. The sickles 9 are located between said bars 8, 8. Each of said sickles is mounted upon a shaft 10 which is journaled in the said bars 8 and each shaft 10 is provided with a crank end 11. The sickles 9 are substantially star-shaped with the longitudinal axes of the points thereof laterally curved and the cutting edges of one sickle are inclined in the opposite direction to the cutting edges of the next adjacent sickle. The points of one sickle overlap the points of the adjacent sickle and the cutting edges of the adjacent sickle coöperate with each other in the manner similar to the action of shears in severing the vegetation. The shaft 12 connects the bars 8, 8 together at one end and the bevel gear 13 is mounted for rotation with the said shaft. The disk 14 is fixed to the shaft 12 and is located above the bars 8. A wrist pin 15 is eccentrically located upon the disk 14. The disk 16 is journaled for rotation at the opposite ends of the bars 8 and is provided with an eccentrically located wrist pin 17. The pitman bar 18 is provided with perforations 19 which receive the cranks 11 of the shafts 10 and the wrist pin 15 and 17 of the disks 14 and 16 respectively. It will thus be seen that as the pitman bar 18 reciprocates that the sickles 9 will be rotated in unison.

One of the traction wheels 3 is provided upon its side with a beveled gear 20. The shaft 21 extends longitudinally of the frame 1 and is provided with a beveled gear wheel 22 which meshes with the beveled gear 20. The beveled gear wheel 23 is also fixed to the shaft 21 and meshes with the beveled gear wheel 13. Thus it will be observed that as the traction wheels 3 rotate such rotary movement is conveyed through the beveled gear 20, beveled gear wheel 22, shaft 21, beveled gear wheel 23 and beveled gear 13 to the shaft 12 and from said shaft 12 the movement is employed for reciprocating the pitman bar 18 and for rotating the sickles 9 as above described. As the implement is moved over the surface of the ground and the said sickles 9 rotate the cutting edges of the overlapping points cleave the vegetation and in such operation the bars 8 perform no function as the cutting is accomplished entirely by the sharp edges of the said sickles.

Having described my invention what I claim as new and desire to secure by Letters-Patent is:—

1. In a mower, a pair of bars spaced apart in parallel relation, shafts journaled in said bars and having crank ends, sickles mounted upon said shafts, disks journaled for rotation at opposite ends of the said bars and having wrist pins, a pitman bar having perforations which receive said wrist pins and said crank ends and a means for rotating said disks.

2. In a mower a frame, parallel bars spaced apart, shafts journaled in said bars and having crank ends, sickles located between the bars and attached to said shafts, shafts journaled at the ends of the bars, disks attached to the last named shafts and having wrist pins, a pitman bar having perforations which receive said wrist pins and the crank ends of the shafts, a beveled gear wheel mounted upon one of the shafts located at the ends of the bars, a traction wheel journaled for rotation to the frame of the implement and a means for transmitting motion from said traction wheel to said gear wheel.

In testimony that I claim the foregoing as my own, I have hereto affixed my signature in the presence of two witnesses:

JAMES HALL SHERRARD.

Witnesses:
HENRY E. BURNS,
DAVID R. BURNS.